Figure 7:
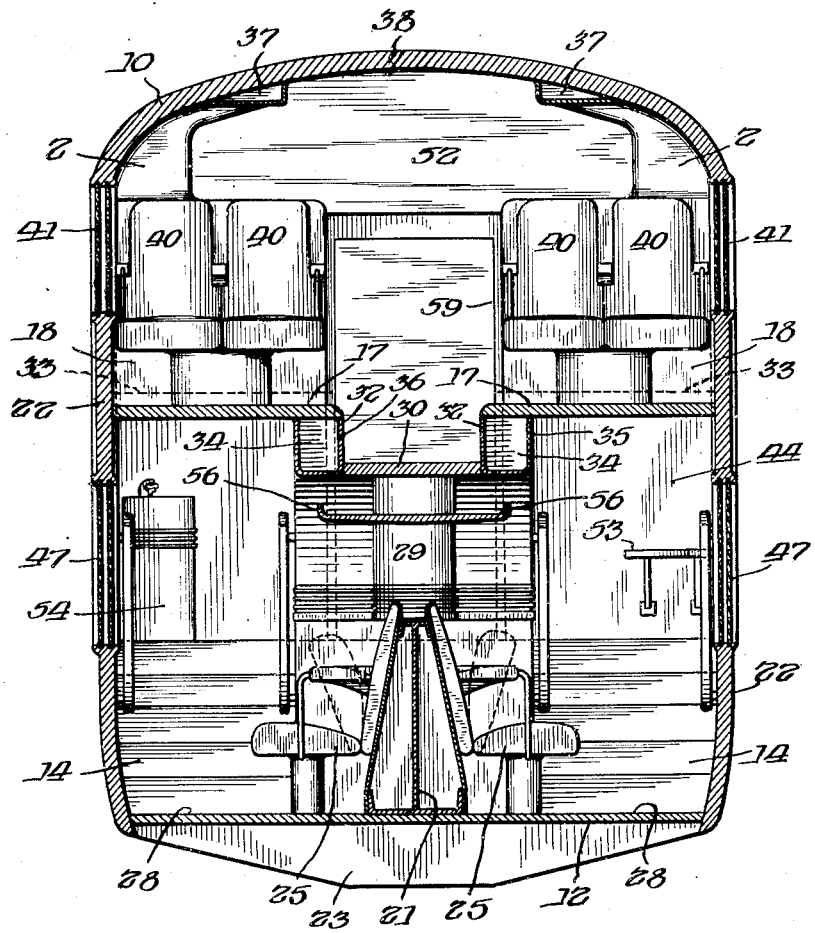

Aug. 6, 1946.  F. J. DITTRICH  2,405,136
DOUBLE DECK VEHICLE
Filed Nov. 30, 1943  6 Sheets-Sheet 1
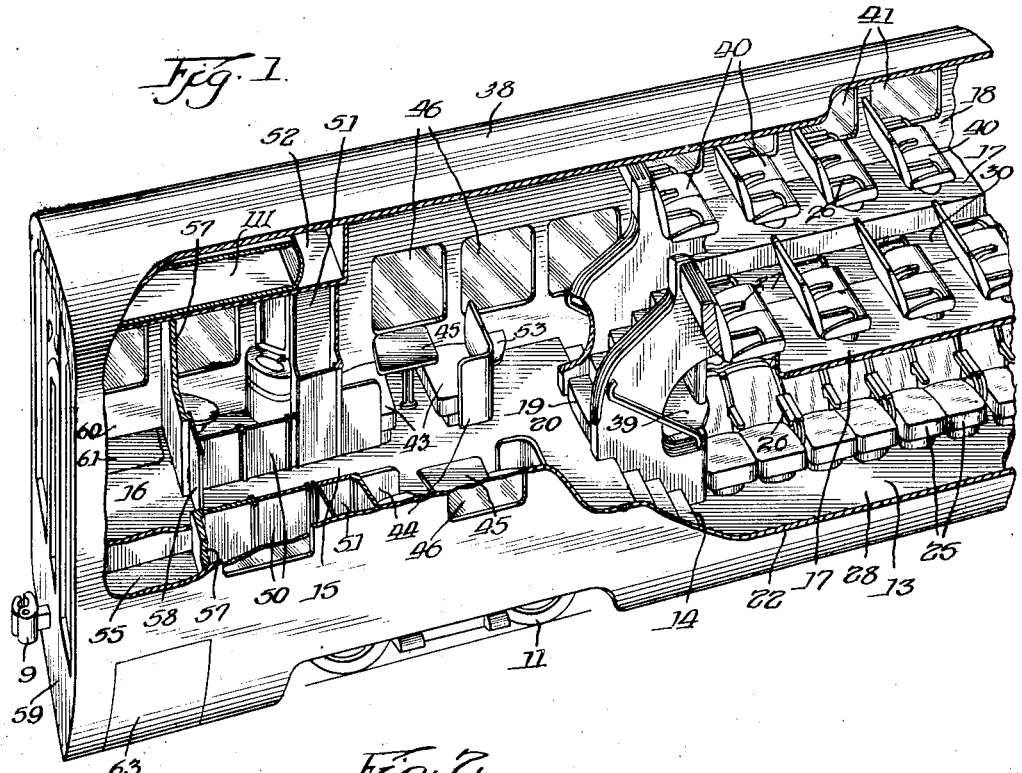
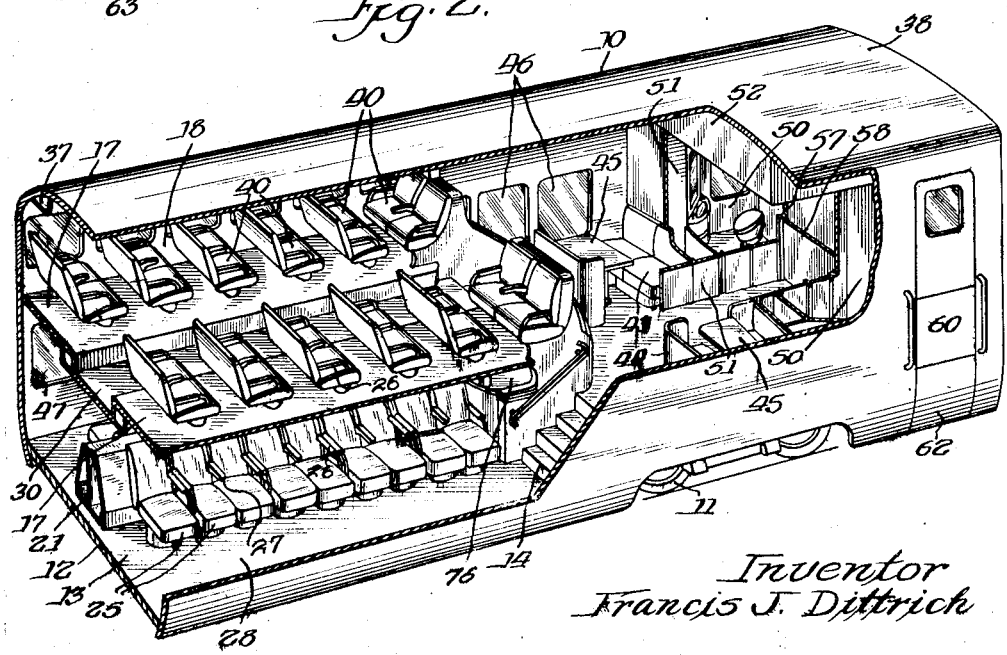
Inventor
Francis J. Dittrich
By Oscar Hochberg Atty.

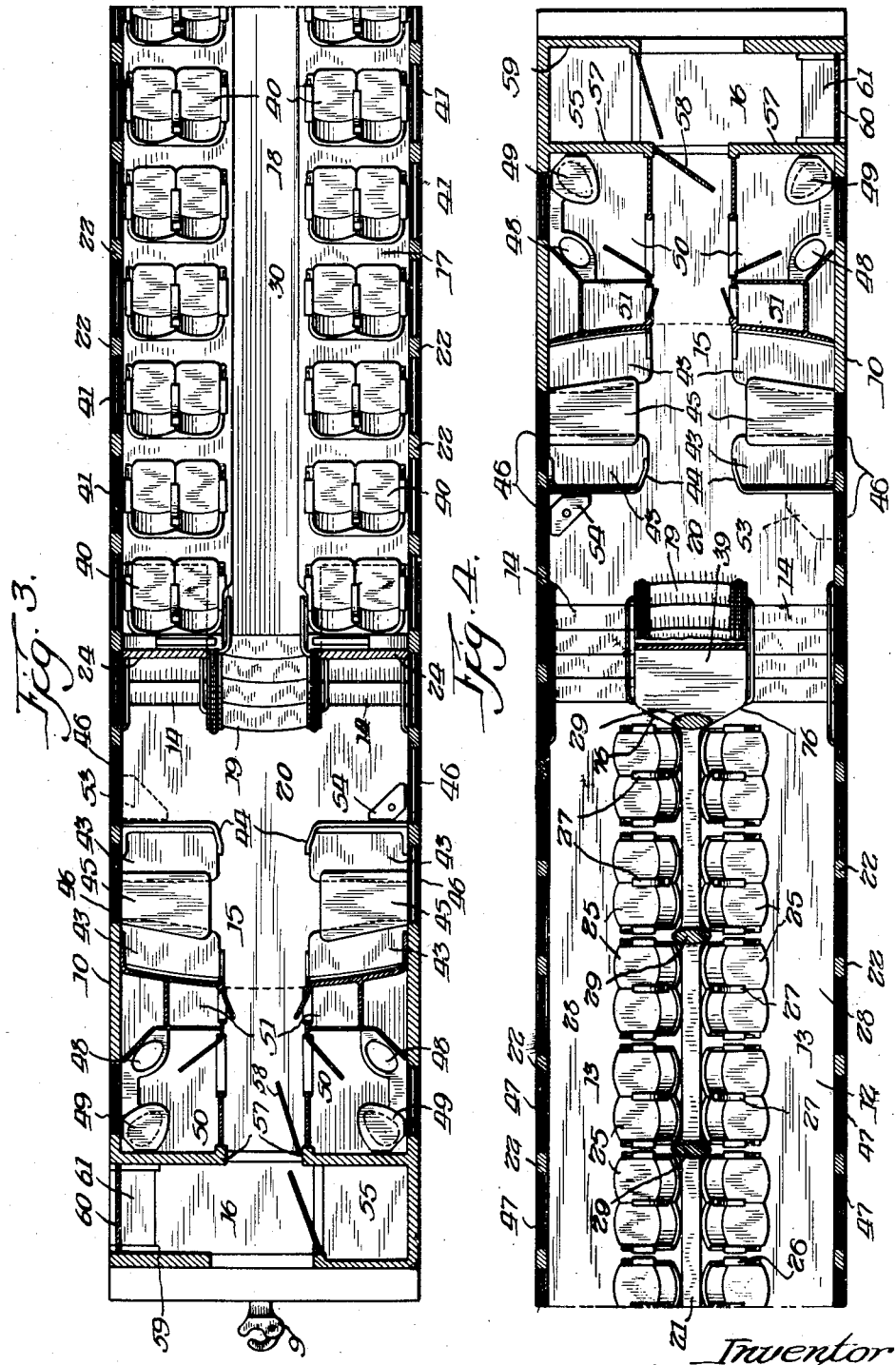

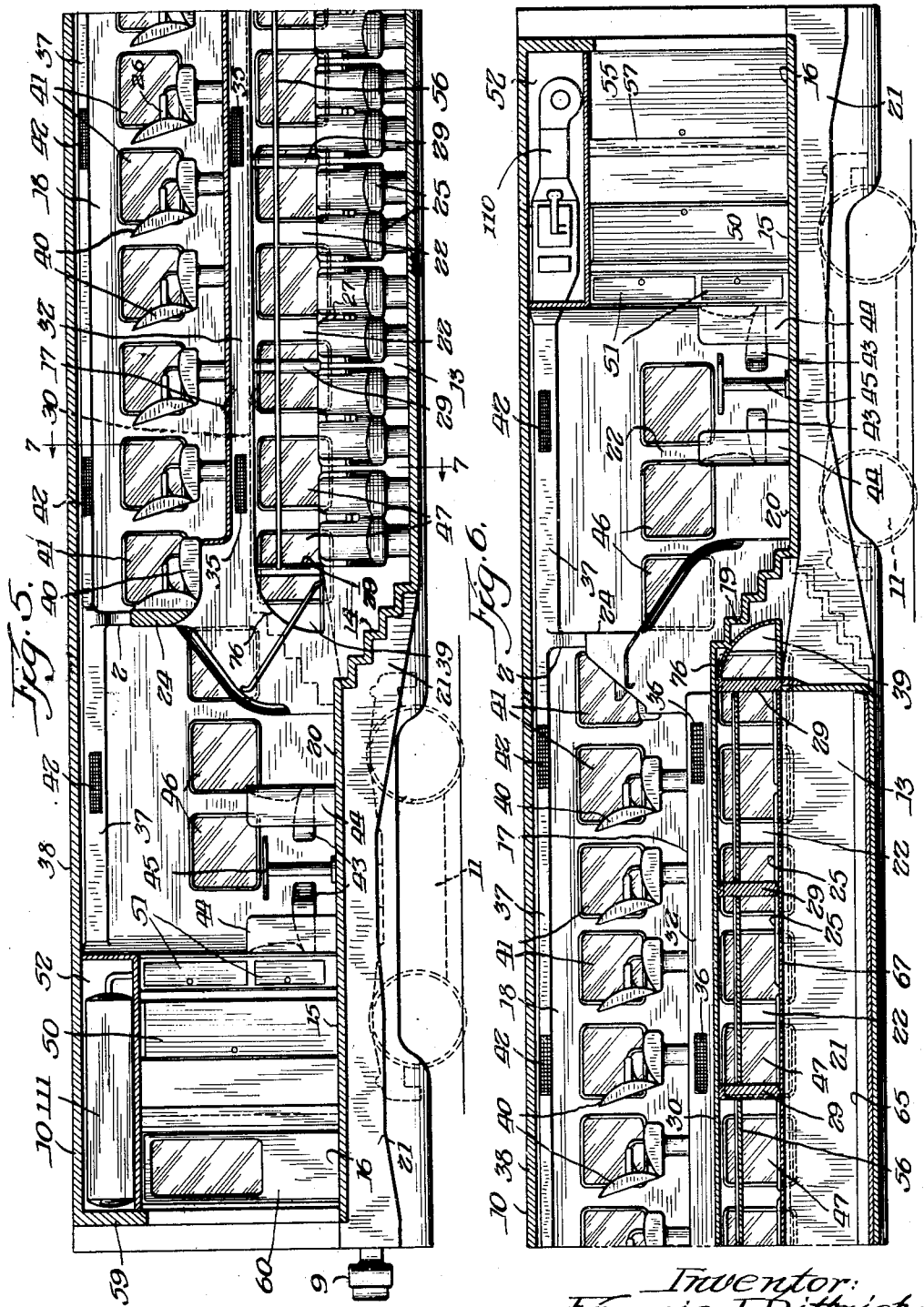

Aug. 6, 1946.   F. J. DITTRICH   2,405,136
DOUBLE DECK VEHICLE
Filed Nov. 30, 1943   6 Sheets-Sheet 4

Inventor:
Francis J. Dittrich
By Oscar Hochberg, Atty.

Aug. 6, 1946.  F. J. DITTRICH  2,405,136
DOUBLE DECK VEHICLE
Filed Nov. 30, 1943  6 Sheets-Sheet 5
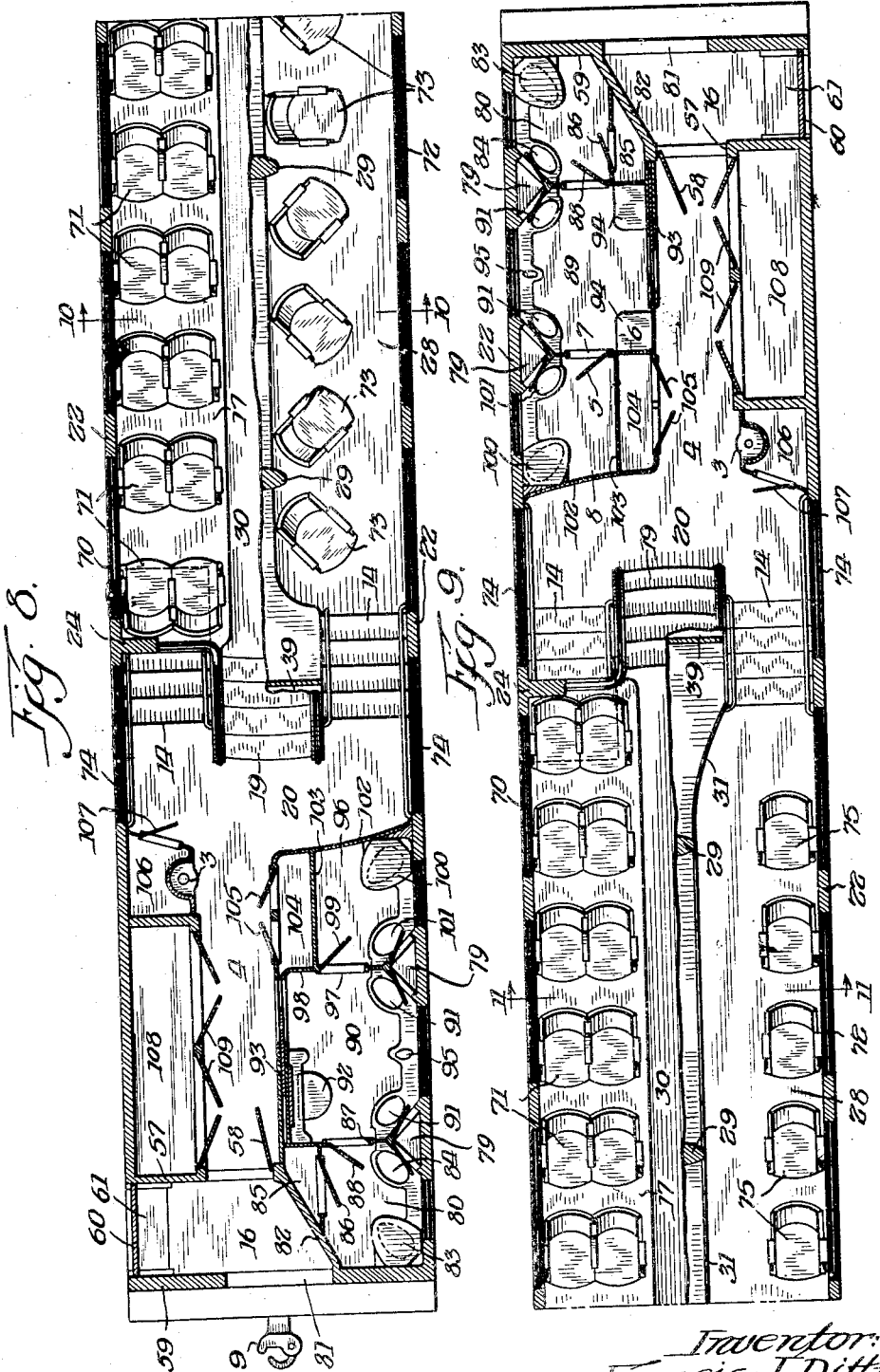

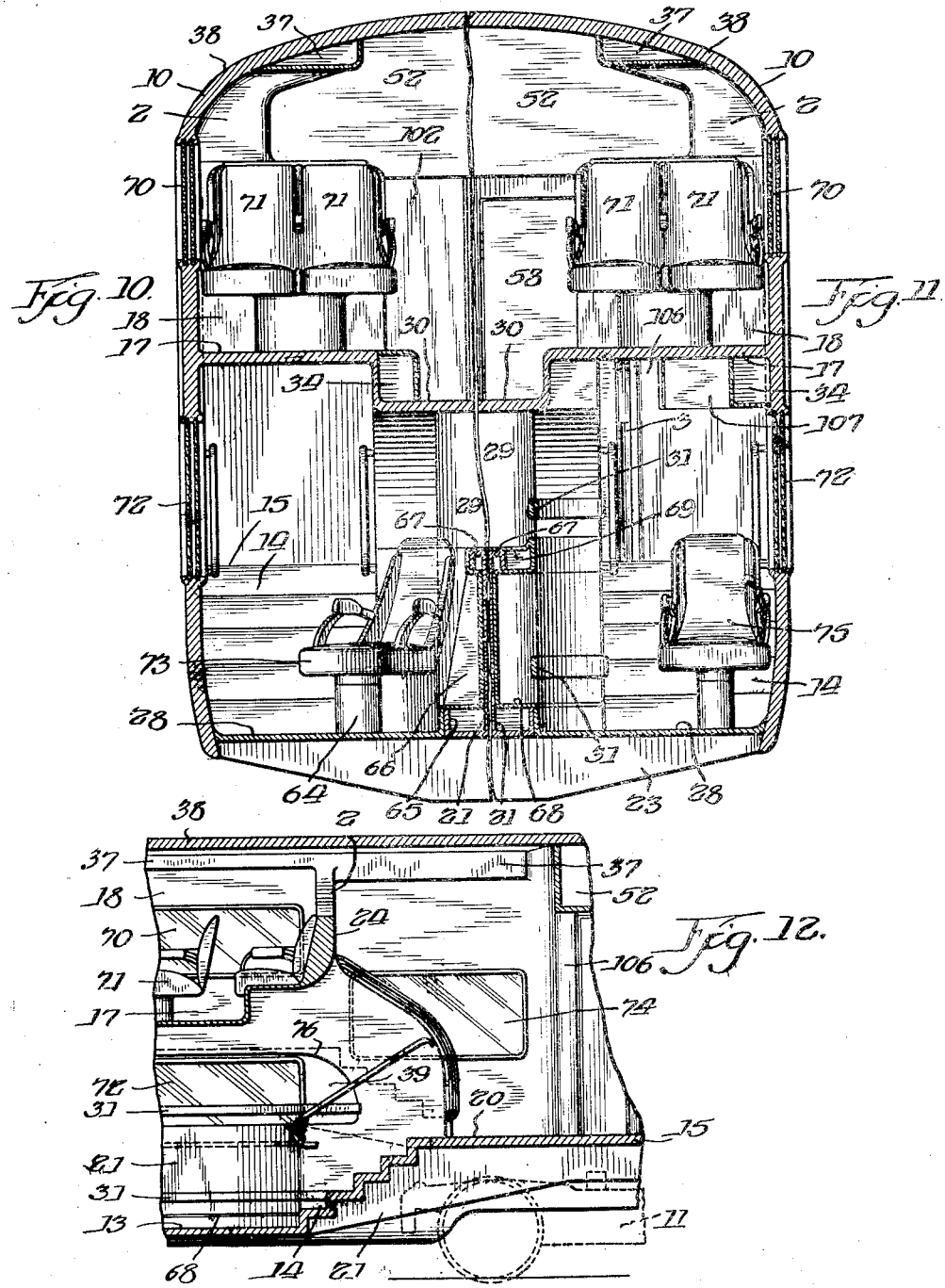

Patented Aug. 6, 1946

2,405,136

UNITED STATES PATENT OFFICE 2,405,136

DOUBLE DECK VEHICLE

Francis J. Dittrich, Chicago, Ill., assignor to Pullman-Standard Car Manufacturing Company, Chicago, Ill., a corporation of Delaware Application November 30, 1943, Serial No. 512,331

14 Claims. (Cl. 105—340)

1

The invention relates to vehicles having a depressed floor portion between the supporting trucks to provide a lower deck occupancy section below the normal floor level of the vehicle and an elevated floor portion in the area above the lower deck section to provide an upper deck passenger occupancy space, with stairways giving access to both decks from the normal floor section of the vehicle.

The principal object of the invention is to provide a light weight double deck vehicle of relatively large passenger capacity within the framework of a vehicle proportioned to meet railway clearance requirements, whereby to lower the passenger unit cost of transportation to a minimum, and to reduce operating expense.

Another object is to produce a double deck vehicle having a low center of gravity and adapted for operations in high speed passenger for service and providing ample facilities for the free movement of occupants to and from the deck passenger space with safety and dispatch.

A further object is to provide a double deck vehicle having ample head room in the traffic lanes of both upper and lower deck passenger spaces within a vehicle proportioned to meet railway clearance requirements with additional passenger occupancy spaces adjoining the entrances to the deck sections at the normal floor level of the vehicle.

Other objects are to provide in a vehicle of the double deck type having upper and lower deck passenger sections terminating substantially in areas of the vehicle between the ends, passenger occupancy spaces adjacent the entrances to the deck spaces with passageways to the vestibules and doorways at the ends of the vehicle and giving access to toilet facilities and operating service equipment installations for lighting and air conditioning of the vehicle and water supply and locker facilities in spaces out of the way of the passengers.

The foregoing objects and other advantages are attained by the arrangement illustrated in the accompanying drawings, in which—

Figs. 1 and 2 are complemental views in perspective of the interior arrangement from end to end of the vehicle showing the upper and lower deck passenger occupancy sections terminating substantially within the plan projection of the area between the inner pairs of wheels of the supporting trucks, and the passenger occupancy sections therebeyond at the normal floor level of the vehicle with stairways giving access to all sections, and showing also the placement of toilet

2 facilities with respect to vestibules at respective ends of the vehicle and the location of vestibule entrance doors at diagonally opposite ends of the vehicle, portions of the vestibule platforms in the embodiment shown being used to accommodate baggage or servicing installations, the figures representing each approximately one-half the whole vehicle.

Fig. 3 is a plan view of approximately half the vehicle corresponding to the portion shown in Fig. 1, depicting the upper deck seating arrangement with seats disposed transversely of the vehicle and upon opposite sides of a central aisle, with stairway to passenger occupancy section at the normal floor level showing passageway to vestibule at that end of the vehicle;

Fig. 4 is a similar view corresponding to the portion shown in Fig. 2 illustrating the seating arrangement in the lower deck occupancy section with seats arranged longitudinally and disposed to face the windows at respectively adjacent sides of the vehicle and upon opposite sides of the vehicle framing center sill buffing column member, with stairways leading upwardly from respective aisles at the sides of the vehicle to the passenger occupancy space at the normal floor level and passageway to vestibule at adjacent end of the vehicle;

Fig. 5 is a vertical sectional view longitudinally of the vehicle through the upper deck floor portion corresponding to that shown in Fig. 3 on near side of the aisle and in a plane intermediate the longitudinally arranged seats of the lower deck and adjacent side wall, through lower floor and stairway leading to normal floor section above the trucks and along passageway to adjacent vestibule, showing in elevation the relative positions of upper deck seats and windows and location of toilet facilities, service lockers and overhead servicing compartments with respect to adjacent vestibule;

Fig. 6 is a view similar to Fig. 5 showing in complemental elevation and section the other half of the vehicle, with the lower deck section seats removed to expose the framing center sill column member at the longitudinal center of the vehicle and showing the upper deck floor supporting posts extending upwardly therefrom with lower deck baggage racks secured to them extending throughout the length of the lower deck seating space with additional luggage space beneath the stairs to upper deck aisle, and showing further the passenger occupancy section at the normal floor level space with passageway to adjacent vestibule showing accessibility of toilet rooms, service lockers, vestibule luggage compartment and overhead water tank or air conditioning chamber;

Fig. 7 is a vertical cross sectional view taken on line 7—7 of Fig. 5, looking in the direction indicated by the arrows, showing the longitudinally arranged seats of the lower deck disposed upon opposite sides of the framing center sill member extending longitudinally of the vehicle above the lower deck floor portion, the side aisle conditions at the lower deck level with stairways leading therefrom to passenger occupancy sections on relatively higher normal floor and the upper deck center aisle depressed below the level of contiguous seat floor portions to provide necessary head room to stairway leading to relatively lower normal floor section, and showing further the disposition of the ventilating ducts for upper and lower deck sections, the posts supporting the upper deck floor from the center sill, and the baggage rack fixture secured to the posts;

Fig. 8 is a view in plan of approximately one-half the vehicle modified to provide windows of sufficient length in the upper and lower deck seating sections to accommodate two seats of the upper deck section, arranged in tandem, within the observation zone of each window; showing a portion of the upper deck flooring broken away to expose the lower deck seat arrangement wherein the seats are of the swiveling type and disposed adjacent the center sill member to provide an aisle at the side wall position giving access to stairways leading to the normal floor section shown equipped with toilet facilities, and providing passageway to adjacent vestibule and affording access to servicing lockers, luggage compartments and storage batteries, ventilating equipment and upper and lower deck sections;

Fig. 9 is a view similar to Fig. 8 but showing the other half of the vehicle modified to provide a lower deck seating arrangement wherein the seats are disposed at the window positions to provide passageways adjacent the center sill member to give access to stairways leading to the normal floor section providing luggage space and toilet facilities for the convenience and comfort of the passengers and affording space for the installation of air conditioning and water supply equipment, all accessible from a passageway leading to adjacent vestibule and upper and lower deck sections;

Fig. 10 is a vertical cross sectional view of one side of a double deck vehicle with seats arranged as shown in Fig. 8, taken on line 10—10 looking in the direction indicated by the arrows, showing the disposition of the ventilating ducts at the roof and aisle position in the upper deck section and the air grille communicating with the aisle duct for ventilating the lower deck section, and further showing the relation of the swivel type seats and the center sill member to provide an aisle at the side wall position;

Fig. 11 is a view similar to Fig. 10 depicting the opposite half of a double deck vehicle with seats disposed as indicated in Fig. 9, taken on line 11—11 looking in the direction indicated by the arrows, illustrating the ventilating ducts at the roof and ceiling positions in upper and lower deck sections, respectively, and showing the passageway adjacent the framing center sill member by the placement of the seats at the window positions; and Fig. 12 is a fragmentary view in vertical section longitudinally of the double deck vehicle shown in Figs. 8 through 11, depicting stairway, air duct, window and upper deck seat conditions obtaining at the end of the double deck section illustrated in Fig. 9, and showing also the foyer area of the normal floor section of the vehicle.

In the drawings, 10 represents the vehicle as a whole, 11 the supporting trucks between the inner wheels of which the floor 12 of the vehicle is depressed to form a lower deck passenger occupancy section 13 with stairways 14 leading therefrom to the relatively higher normal floor 15 extending to vestibule 16 at adjacent end of the vehicle. Above the lower deck section 13 and within the plan projection thereof and stairways 14 is provided an elevated floor portion 17 affording an upper deck passenger occupancy section 18 to which access is had by stairways 19 leading upwardly from the normal floor portion 15, as best shown in Figs. 1 through 6, illustrating a preferred embodiment of the invention. The deck sections 13 and 18 terminate substantially in the plan projection of the area between the trucks 11 with their opposite end portions giving access to respectively adjacent foyer areas 20 on the normal floor sections 15 to provide for the free movement of passengers to and from the deck sections.

The lower deck floor portion 12 is supported between the framing center sill member 21 and respective side wall framing 22 by framing members 23 and between the bulkheads 24 at the ends of the deck section 13. The lower deck seats 25 are preferably arranged in pairs with end arm rests 26 and, if desired, intermediate arm rests 27 between the seats of each pair, as shown. These seats 25 are adapted to be raised to dotted position as shown in Fig. 7 to allow greater freedom for movement of occupants through the aisles 28 and to facilitate cleaning operations. The seats are supported upon deck floor 12 and upon opposite sides of the framing center sill member 21 which, at the lower deck position, extends above the deck floor to a height necessary to raise the center of gravity of the sill to approximate the line of draft at the ends of the sill at the couplers 9, the presence of the sill element within the deck section being rendered unobtrusive by the placement of the seats 25 with their backs close to the sill and also to allow more room for the aisle 28 at the vehicle side wall.

Resting upon and projecting upwardly from center sill 21 are a number of supporting posts 29 for the upper deck floor 30. The posts are spaced longitudinally of the sill 21 to provide support for the upper deck floor at the aisle 30 adjacent the stairways 19 and points intermediate the ends of the upper deck. The aisle 30 is depressed below the level of the seat floor portions 17 on opposite sides thereof to provide necessary head room for passengers moving along the aisle. The depressed floor of the aisle 30 and the seat floor 17 of the upper deck are connected by side wall portions 32 serving also as beam members for supporting the upper deck section between bulkhead members 24 as will be evident from inspection of Figs. 1, 2, 5, 6 and 7 of the drawings. The section floor is further reinforced crosswise of the vehicle at points intermediate the bulkheads by transverse members 33 connecting the aisle beams 32 with side wall framing 22. These aisle beams may function also as ducts 34 for the ventilating system with grille portions 35 or 36 to supply air to upper and/or lower deck sections to supplement ventilating ducts 37 at the roof 38 of the vehicle.

The upper deck seats 40 are disposed transversely on floors 17 and positioned each at individual windows 41 in the vehicle side for the length of the upper deck, suitable grille openings 42 being available for ventilating the entire upper seat area from ducts 37.

Additional passenger occupancy sections may be provided outside the upper and lower deck sections 13 and 18 on the normal floor 15 beyond the foyer area 20 as shown by the installation of seats 43 facing each other in stalls 44 with removable table 45 between them for use by the occupants, the stalls being disposed upon opposite sides of the passageway to vestibules 16. Windows 46 are provided for these sections and other windows 47 in the walls of the lower deck section 13 for the length of said section and in a horizontal plane below the windows 46. For the convenience of all the occupants, suitable toilet facilities are provided in compartments 50 with washstands 48 and hoppers 49, these compartments being disposed upon opposite sides of the passageway to adjacent vestibules 16, and separated from passenger seating area by service lockers 51, as shown in Figs. 1 through 6; in compartments 52 overlying these facilities may be accommodated the water supply tank 111 and ventilating equipment 110. A porter's seat 53, foldable if desired, may be set up outside the seat stall 44 on one side of the foyer 20 and a drinking fountain 54 against the stall 44 on the opposite side. A portion of vestibule area 16 may be utilized for the storage of luggage in compartment 55 for the heavier pieces of baggage belonging to the passengers, the lighter parcels and articles of apparel of the occupants being accommodated by the basket racks 56 supported from posts 29 and extending the length of the lower deck seating space, as best shown in Figs. 5, 6 and 7. The vestibule luggage compartment 55 and the remaining portion of the vestibule 16 are separated from the toilet compartments 50 by end bulkhead 57 having door 58 between said compartments giving access to passenger space, while door opening in vestibule end wall 59 provides passageway to adjacent cars of the train. Passengers enter and leave the vehicle through vestibule entrance closed by doors 60 opening inwardly against the end bulkhead 57 to permit raising of trap door 61 to uncover steps 62. Beneath the floor of the vestibule luggage compartment 55 may be carried storage batteries in boxes 63 accessible for inspection from outside the vehicle as shown in Fig. 1.

The invention is susceptible of modification with respect to the arrangement of the windows in upper and lower deck occupancy sections and in the vehicle sides at the ends of said sections at opposite sides of the foyer area 20 on the normal floor 15 as best shown in Figs. 8, 9 and 12. In the modified form, the windows 70 of the upper deck section 18 are of a length sufficient to permit the placement of two seats 71 within the observation zone of the several windows as shown in Figs. 8 and 9. The windows 72 in the lower deck section 13 are likewise elongated to permit ample observation to occupants of chairs 73 of the swiveling type placed adjacent the center sill 21 and suitably spaced to allow the occupants to move freely in their seats without unduly encroaching upon the aisle space 28 at the vehicle side and to clear the center sill member and adjacent seat occupants, thus affording greater spaciousness of accommodation for occupants of the lower section.

Elongated windows 74 are also provided in the normal floor section at the entrances to the deck sections upon opposite sides of the respective foyer areas 20, as best shown in Figs. 8, 9 and 12. Revolving chairs of the type indicated are particularly suitable for lower deck seating equipment since the swivel base portion 64 is well within the seat orbit of movement to permit closer approach to the sill member 21 which in the embodiment shown, is formed with a relatively wide bottom chord member 65 and girder stiffening members 66 sloping upwardly to the relatively narrow upper chord member 67 whereby chairs of this type are especially adapted for use in structures having sill members projecting above the floor line where it is desirable to locate the aisles at the side wall position as shown in Figs. 8 and 10. In constructions favoring location of the lower deck aisle 28 toward the center sill position as shown in Figs. 9 and 11, the seats 75 may be of individual fixed or reversible type arranged in tandem probably two at each of the windows 72, as shown in Figs. 9 and 11. With the aisle 28 positioned adjacent the center sill 21, the relatively broad base at adjacent sides of the sill presented by the upper surface of the outwardly projecting bottom chord member 65 may be utilized for luggage storage purposes as shown in Fig. 11 at 68; similar provision may be made at the upper chord 67 the relatively flat upper surface presented being adapted for supporting shelving portions 69 projecting outwardly from the sill to accommodate luggage as shown in this figure, guard rails 31 secured to framing posts 29 and/or sill are provided to retain luggage in position and extend throughout the lower deck seating section to luggage compartments 39 under stairways 19 affording additional luggage space to which access may be had through openings 76 in the side walls of the compartment.

In the modified normal floor section arrangements shown in Figs. 8 through 12, the car servicing and passenger accommodation facilities include the placement of toilet rooms 80 in one end of respective vestibules 16 at one side of door openings 81 in vehicle end walls 59 as best shown in Figs. 8 and 9, the rooms being separated from the remaining areas of respective vestibules by partitions 82 sloping outwardly from the toilet room space to door opening in end bulkhead 57; these toilets are fitted with hoppers 83 and washbasins 84, and formed with supply lockers 85 closed by doors 86 accessible only from the inside, and provided further with cabinets 79 above the washbasins. Adjoining these toilet rooms 80 are the washroom 90 for women at one end of the vehicle containing a plurality of washbasins 91 and a dressing table 92 as shown in Fig. 8 positioned at aisle partition 93. At the opposite end of the vehicle a similar washroom 89 for men is fitted with dressing-case shelves 94 at the aisle partition 93 and with a plurality of washbasins 91 having soap dispenser fixture 95 on the washstand between them; a similar fixture is applied to the washstand in the women's room, all as shown in Figs. 8 and 9. From the women's washroom 90 access to toilet room 80 is had through door opening in partition 87 closed by door 88; the washroom opens to additional toilet room 96 through doorway 97 in opposite wall 98 of the washroom, the second toilet being closed by door 99. A similar arrangement for men obtains at the opposite end of the vehicle in which an additional toilet room 8 is provided having hopper 100 and washbasin 101, the room being enclosed by wall 102 at the foyer area 20 of contiguous floor section 15, access to the toilet room being had through door opening 7 in partition 6 closed by door 5. Both toilet rooms 96 and 8 have each a partition 103 extending parallel to vehicle side wall to allow room for locker space 104 opening to the aisle 4 and closed by doors 105. Thus constituted, the respective toilet and washroom arrangement are positioned at diagonally opposite corners of the vehicle as indicated in Figs. 8 and 9.

Other facilities for car servicing are provided on opposite side of aisle 4 at both ends of the vehicle and at oppositely diagonal corners as shown in Figs. 8 and 9. Drinking fountains 3 are positioned adjacent foyer areas 20 and above said fountains are supply lockers 106 closed by doors 107. Adjoining said lockers are other lockers 108 closed by doors 109 which may be adapted for housing batteries and control equipment or storage of luggage, as desired.

It will be noted that the air conditioning equipment 110 in overhead compartment 52 as shown in Fig. 6 supplies air to ducts 37 at the roof position for ventilating upper deck occupancy section 18 and normal floor sections of the vehicle, and branch ducts 2 extending downwardly from ducts 37 supply air to lower ducts 34 for ventilating the lower deck occupancy section 13 as will be evident from structure shown in Figs. 6, 7, 10, 11 and 12. It should also be observed that ample standing height for occupants of upper and lower deck sections is afforded the passengers and in the normal floor sections of the vehicle to permit free movement of passengers in all of the accommodation spaces of the vehicle.

What is claimed is:

1. A double deck vehicle comprising a body portion having a depressed floor section between the supporting trucks, normal floor sections extending from above the trucks to respective ends of the vehicle, a continuous framing center sill upstanding from said depressed floor section dividing said section into seating compartments providing passageways longitudinally of the vehicle, a plurality of laterally spaced stairways at the ends of said passageways connecting depressed and normal floor sections, an elevated floor section above and terminating within the plan projection of said depressed floor section and said stairways, and other stairways intermediate said first-mentioned stairways connecting said elevated and normal floor sections.

2. A double deck vehicle comprising a body portion having a depressed floor section between the supporting trucks, normal floor sections extending from above the trucks to respective ends of the vehicle, a continuous framing center sill upstanding from said depressed floor section dividing said section into compartments providing passageways extending longitudinally of the vehicle throughout the length of said section, pairs of laterally spaced stairways at the ends of said passageways connecting said compartments and normal floor sections, an elevated floor section above and terminating substantially within the plan projection of said depressed floor section and stairways and having a depressed aisle portion extending from end to end thereof, and stairways between each pair of said first-mentioned stairways connecting said aisle and normal floor sections.

3. A double deck vehicle comprising a body portion having a depressed floor section between the supporting trucks, normal floor sections extending from above the trucks to respective ends of the vehicle, pairs of laterally spaced stairways connecting said depressed and normal floor sections, a framing center sill member projecting upwardly from said depressed floor section between said stairways and beneath said normal floor portions to the ends of the vehicle and dividing said depressed floor section into compartments providing passageways extending longitudinally of the vehicle throughout the length of said section, an elevated floor section above and terminating substantially within the plan projection of said depressed floor section and stairways, stairways straddling said center sill member intermediate each said pairs of stairways connecting said elevated and normal floor sections, and framing posts projecting upwardly from the center sill member between said intermediate stairways for supporting the elevated floor section.

4. A double deck vehicle comprising a body portion having a floor section depressed between the trucks, normal floor sections extending from above the trucks to respective ends of the vehicle, a framing center sill member projecting upwardly from said depressed floor section and beneath said normal floor portions to the ends of the vehicle and dividing said depressed floor section into compartments providing passageways extending longitudinally of the vehicle throughout the length of said section, an elevated floor section above and terminating substantially within the plan projection of the depressed section between the normal floor sections, framing posts for supporting said elevated floor section extending upwardly from said sill member, and intermediate and laterally spaced-apart stairways connecting the normal floor sections with said elevated and depressed floor sections, respectively.

5. A double deck vehicle comprising a body portion having a floor section depressed between the supporting trucks, normal floor sections extending from above the trucks to respective ends of the vehicle, a framing center sill member extending beneath said normal floor sections to the ends of the vehicle and projecting upwardly from said depressed floor section and dividing said depressed floor section into compartments providing passageways extending longitudinally of the vehicle throughout the length of said section, framing post members projecting upwardly from the center sill between said normal floor sections, an elevated floor section above and substantially within the plan projection of the depressed section supported upon said framing posts, laterally spaced-apart and relatively intermediate stairways connecting said depressed and elevated floor portions with the normal floor sections, respectively, and seats facing the vehicle windows of the lower deck section arranged longitudinally of said compartments and passageways and upon opposite sides of said sill.

6. A double deck vehicle comprising a body portion having a depressed floor section between the supporting trucks, normal floor sections extending from above the trucks to respective ends of the vehicle, a framing center sill member extending beneath said normal floor sections and projecting upwardly from said depressed floor section and dividing said depressed floor section into compartments providing passageways extending longitudinally of the vehicle throughout the length of said section, pairs of stairways laterally spaced apart connecting said depressed and normal floor sections, an elevated floor section above and terminating substantially within the plan projection of said depressed floor section and having a depressed aisle portion and seats normal to the vehicle wall disposed upon opposite sides of said aisle between the ends of said section, other seats in the lower deck section arranged longitudinally of the compartments and passageways upon opposite sides of the center sill member, and stairways intermediate each said pairs of said first-mentioned stairways connecting said normal floor sections and respectively adjacent ends of the depressed aisle of the elevated floor section.

7. In a vehicle of the double deck type having a body portion with a depressed section between the supporting trucks, normal floor sections extending from above the trucks to connect with vestibules at respective ends of the vehicle, a continuous center sill member extending beneath said normal floor sections and projecting upwardly from said depressed floor section and dividing said section into compartments providing passageways extending longitudinally of the vehicle throughout the length of said section, pairs of stairways laterally spaced apart connecting said passageways and normal floor sections, an elevated floor section above and terminating within the plan projection of said depressed floor section and said stairways, other stairways intermediate each said pairs of said first-mentioned stairways connecting said normal floor sections and respectively adjacent ends of the elevated floor section, toilet facilities at one end of the respective vestibule spaces opposite the vestibule doors and disposed at diagonally opposite sides of the vehicle, toilet and wash-rooms communicating with said first-named toilet, servicing locker facilities at the vehicle wall opposite said last-named toilet and washrooms, and foyer space intermediate said depressed floor section and respectively adjacent facilities, said stairways connecting respectively adjacent foyers with the passageways and elevated floor section.

8. A double deck vehicle comprising a body portion having a floor section depressed between the supporting trucks, normal floor portions extending from above the trucks to connect with vestibules at respective ends of the vehicle, a continuous center sill member extending beneath said normal floor portions and projecting upwardly from said depressed floor section and dividing said section into compartments providing passageways extending longitudinally of the vehicle throughout the length of said section, an elevated floor section above and terminating within the plan projection of said depressed floor section, a luggage compartment at one end of the respective vestibule spaces opposite the vestibule doors and disposed at diagonally opposite sides of the vehicle, toilet facilities adjacent said vestibules and upon opposite sides of the vehicle, servicing compartments adjoining said toilets, passenger occupancy seat stalls adjoining said servicing compartments, foyer spaces intermediate said occupancy stalls and depressed floor section, pairs of laterally spaced stairways connecting respectively adjacent foyers with said passageways, and other stairways intermediate each said pairs of said first-mentioned stairways connecting said foyers and respectively adjacent ends of said elevated floor section.

9. A double deck vehicle comprising a body portion having a depressed floor section between the supporting trucks, normal floor sections extending from above the trucks to respective ends of the vehicle, pairs of laterally spaced stairways connecting said depressed and normal floor sections, a framing center sill member projecting upwardly from and extending longitudinally of said depressed floor section between each said pairs of stairways and beneath said normal floor portions to the ends of the vehicle and providing compartments upon opposite sides of said sill in the depressed floor section having passageways connecting the stairways of each pair, an elevated floor section overlying said sill member and terminating substantially within the plan projection of said depressed floor compartments, stairways and connecting passageways, other stairways straddling said center sill member between the stairways of each said pairs of stairways connecting said elevated and normal floor sections, and framing members between said stairways for supporting the elevated floor section.

10. A double deck vehicle comprising a body portion having a depressed floor section between the supporting trucks, normal floor sections extending from above the trucks to respective ends of the vehicle, a continuous center sill member extending beneath said normal floor sections and projecting upwardly from said depressed floor section and providing compartments upon opposite sides of said sill having passageways extending throughout the length of said section, laterally spaced-apart stairways connecting said passageways with respectively adjacent normal floor sections, an elevated floor section terminating substantially within the plan projection of said depressed floor section and having a depressed aisle portion terminating in stairways disposed between said first-mentioned stairways with supporting wall members extending upwardly for the length of said aisle to form one side of ventilating duct sections flanking the aisle, and roof duct portions having operative connection with said last-named duct sections extending beyond the ends of said elevated floor portion for ventilating the normal floor sections of the vehicle.

11. A double deck vehicle comprising a body portion having a depressed floor section between the supporting trucks, normal floor sections extending from above the trucks to respective ends of the vehicle, a continuous center sill member extending beneath said normal floor sections and projecting upwardly from said depressed floor section and providing compartments upon opposite sides of said sill having passageways extending throughout the length of said section, stairways laterally spaced apart in pairs connecting the respective normal floor sections with said passageways, an elevated floor section terminating substantially within the plan projection of said depressed floor section and having a depressed aisle portion terminating in stairways disposed between said first-mentioned stairways with supporting wall members extending upwardly for the length of said aisle to form one side of air duct sections flanking the aisle and provided with grilles open beneath the elevated floor section for ventilating the lower deck portion of the vehicle, and roof duct portions extending beyond the ends of said elevated floor section for ventilating said elevated and normal floor sections.

12. A double deck vehicle comprising a body portion having a depressed floor section between the supporting trucks, normal floor sections extending from above the trucks to respective ends of the vehicle, a continuous center sill member extending beneath said normal floor sections and projecting upwardly from said depressed floor section and providing compartments upon opposite sides of said sill having passageways extending throughout the length of said section, stairways laterally spaced apart in pairs connecting each said normal floor sections with said passageways, an elevated floor section overlying and terminating within the plan projection of said depressed floor section and stairways, other stairways between each pair of said first-mentioned stairways connecting said normal and elevated floor sections, and storage compartment space beneath said last-mentioned stairways accessible from said passageways.

13. A double deck vehicle comprising a body portion having a depressed floor section between the supporting trucks, normal floor sections extending from above the trucks to respective ends of the vehicle, stairways laterally spaced in pairs connecting said depressed and normal floor sections, a continuous center sill member projecting upwardly from said depressed floor section and providing compartments upon opposite sides of said sill having passageways connecting respective stairways, an elevated floor section overlying said sill member and terminating substantially within the plan projection of said depressed floor section and stairways, other stairways straddling said center sill member between the stairways of each said last-mentioned pairs of stairways connecting said elevated and normal floor sections, framing post members projecting upwardly from the center sill intermediate said last-mentioned stairways for supporting the elevated floor section, and luggage racks secured to said post members.

14. A double deck vehicle comprising a body portion having a depressed floor section between the supporting trucks, normal floor sections extending from above the trucks to respective ends of the vehicle, stairways laterally spaced apart in pairs connecting said depressed and each said normal floor sections, a center sill member projecting upwardly from and extending longitudinally of said depressed floor section between said stairways and beneath said normal floor portions to the ends of the vehicle and providing compartments upon opposite sides of said sill having passageways connecting respective stairways of each pair, an elevated floor section overlying said sill member and terminating substantially within the plan projection of said depressed floor section stairways, other stairways straddling said center sill member between the stairways of each pair aforesaid connecting said elevated and normal floor sections, framing post members projecting upwardly from the center sill intermediate said last-mentioned stairways for supporting the elevated floor section, luggage accommodation means at the upper chord and base portions of said sill, and luggage retaining rails extending longitudinally of said depressed floor section compartments and secured to said post and sill members and accessible from said passageways.

FRANCIS J. DITTRICH.

Certificate of Correction

Patent No. 2,405,136.  August 6, 1946.

FRANCIS J. DITTRICH

It is hereby certified that errors appear in the printed specification of the above numbered patent requiring correction as follows: Column 1, line 19, strike out "for" after "passenger" and insert instead *train* ; column 6, line 65, after "is" strike out "a" ; and that the said Letters Patent should be read with these corrections therein that the same may conform to the record of the case in the Patent Office.

Signed and sealed this 22nd day of October, A. D. 1946.

[SEAL]

LESLIE FRAZER,
*First Assistant Commissioner of Patents.*